Figure 1:
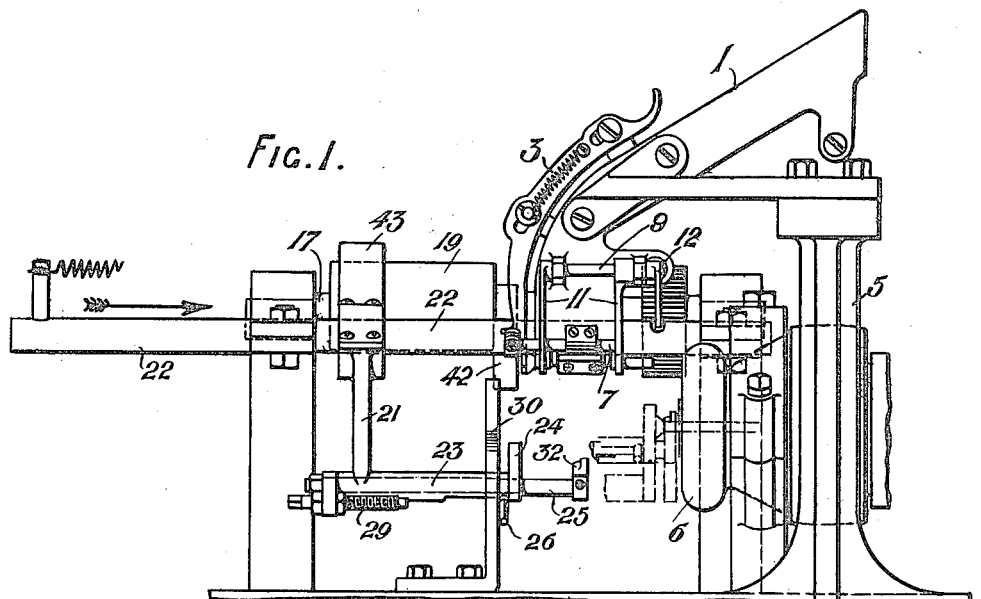

W. AVERY.
FEEDING MECHANISM FOR SCREW NICKING AND TURNING MACHINES.
APPLICATION FILED AUG. 25, 1914.

1,150,240.

Patented Aug. 17, 1915.
4 SHEETS—SHEET 1.

Witnesses.

Inventor:
William Avery
by his attorney

W. AVERY.
FEEDING MECHANISM FOR SCREW NICKING AND TURNING MACHINES.
APPLICATION FILED AUG. 25, 1914.

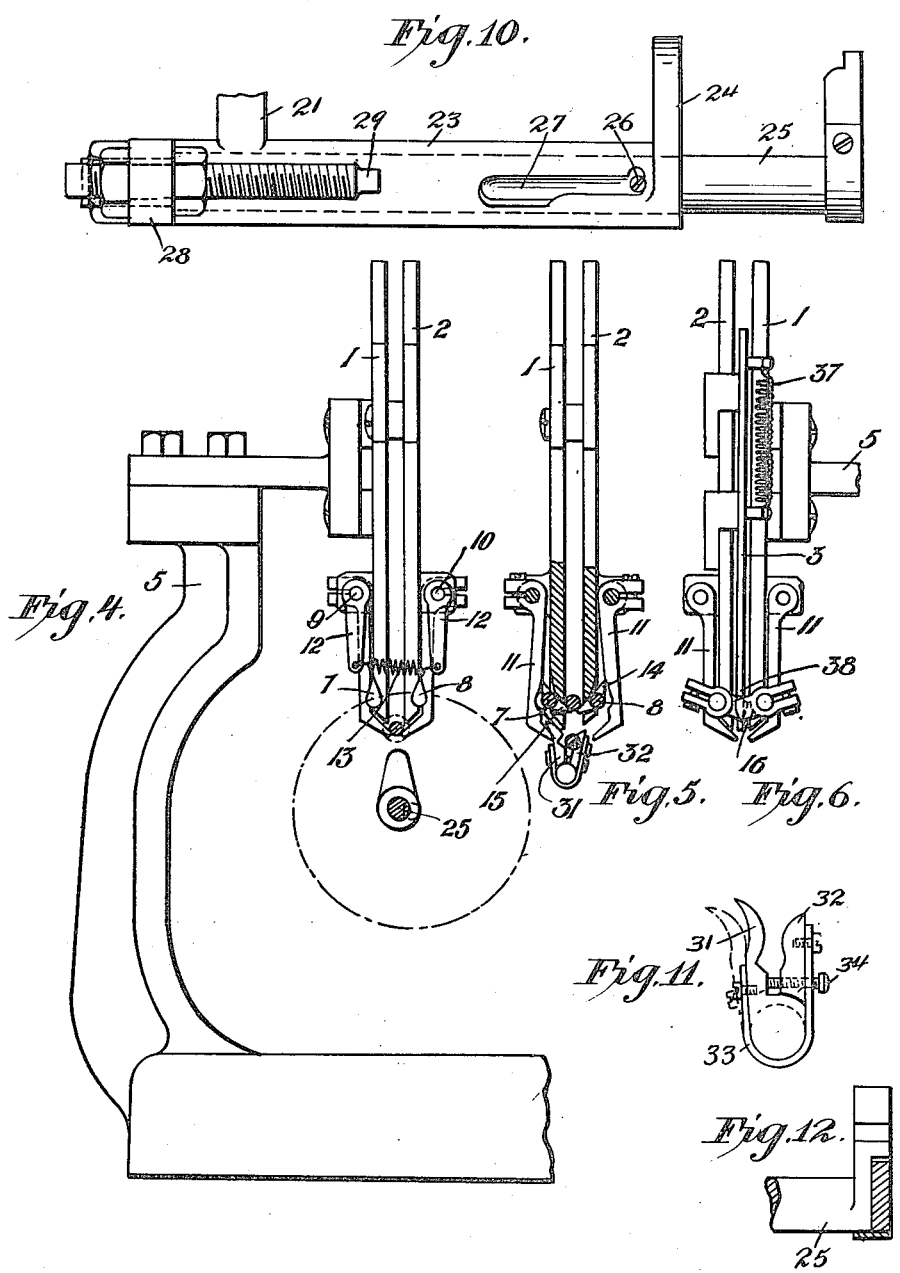

UNITED STATES PATENT OFFICE.

WILLIAM AVERY, OF RICHMOND, ENGLAND.

FEEDING MECHANISM FOR SCREW NICKING AND TURNING MACHINES.

1,150,240.  Specification of Letters Patent.  Patented Aug. 17, 1915.

Application filed August 25, 1914. Serial No. 858,482.

*To all whom it may concern:*

Be it known that I, WILLIAM AVERY, engineer, a subject of the King of Great Britain, residing at 22 Pagoda avenue, Richmond, in the county of Surrey, England, have invented certain new and useful Improvements in Feeding Mechanism for Screw Nicking and Turning Machines, of which the following is a specification.

This invention relates to improvements in mechanism for or relating to feeding screw blanks to screw nicking and turning machines.

In the class of machines to which the present invention refers, it is required that a single screw blank consisting of a cylindrical metal shank formed at one end with a head, shall be taken from a supply chute in which there is a store of such blanks, and that single blank shall be carried to a position in which it is coaxial with gripping jaws, into which jaws the shank of the blank is to be placed, so that the head of the blank projects a predetermined distance beyond the said jaws. Upon the jaws closing and gripping the shank of the blank, the feeding mechanism is then to leave the blank which it has delivered to the jaws and is to have the requisite movements communicated to it, so that it collects the next blank from the chute and so on. In so feeding blanks one after another to gripping jaws, certain difficulties have been encountered. As commercially manufactured, the heads of the blanks are not always concentric with the shanks, nor are they truly circular always, and moveover they may have burs or irregularities left upon them by the stamping process in the course of manufacture, and such a blank after being gripped by the gripping jaws is acted upon by mechanism which turns the head concentric with the shank and forms the notch or nick in the head. Moreover in feeding the blanks whatever may be the length of the shanks, that shank must be passed into the gripping jaws to such a depth that the face of the blank head projects one certain definite distance from the exterior end of the jaws; and having been taken from the lower end of a chute containing a number of such blanks, the blank so taken must be held coaxial with the gripping jaws, and the same feed apparatus must be capable of being employed for all the varying sizes of blanks which are ordinarily used.

Now in the specification of my United States Patent No. 948492 dated 8th February 1910 I have described mechanism which effectively and accurately fulfils the requirements above set out, the shank of the blank being seized from the chute between fingers by which it is automatically centered and supported in a position coaxial with the axis of the jaws, and having been brought coaxial with the said jaws, a pushing member is brought against the head of the blank so held in the jaws, and the blank is slid endwise in the direction of its axis through the carrying fingers and into the jaws so far that its head projects therefrom the predetermined distance, and upon the jaws closing, the feed fingers are drawn away and given movements to collect the next blank to be operated upon from the chute. Such a chute here referred to has consisted of a pair of vertically arranged inclined bars carrying the blanks in the space between them, the lowermost blanks being substantially in a horizontal position and held by spring arms closing the space at the lower end of the guide bars sufficiently to normally prevent the blanks leaving the lower end, until the lowermost blank became grasped by the carrying fingers before referred to. A downward movement of the carrying fingers gripping the blank between them, carried the lowermost blank away from the chute, from between the ends of the spring arms, causing the latter to spring outward, and they immediately closed beneath the next blank. In such an arrangement however the carrying fingers were to be opened by contact with the shank of the lowermost blank, and therefore it was necessary that there should be a sufficient number of blanks in the chute to prevent the fingers driving the lowermost blank up the chute without opening sufficiently to receive it, and the relative strengths of the springs retaining the spring arms closing the end of the chute, and the spring closing the carrying fingers, required delicately adjusting and considerable attention in maintenance.

Now the object of the present invention is to provide means whereby when the carrying fingers rise to receive a blank, they are mechanically and positively opened by other means than contact with the blank, and moreover the lower end of the chute is fitted with mechanism which is operated upon by the rise of a member connected with the carrying fingers, the operation of which mechanism releases the lowermost blank, permitting it to drop between the open carrying fingers, while at the same time retaining arms pass beneath the next upper blank to retain it and those above it in the chute. Further the mechanism comprises a guide piece, located immediately in front of the space between the guide bars and in front of the heads of the blanks, and this guide piece is utilized according to the present invention by having a movement imparted to it at intervals, so that it not only guides the heads of the blanks in their downward movement, but also by its movement relatively to the blank heads prevents delay or stoppage in the downward travel of the blanks and brings the lowermost blank, which is to be received by the fingers, into the correct position.

The invention will now be further described with reference to the accompanying drawings, whereon,—

Figure 2:
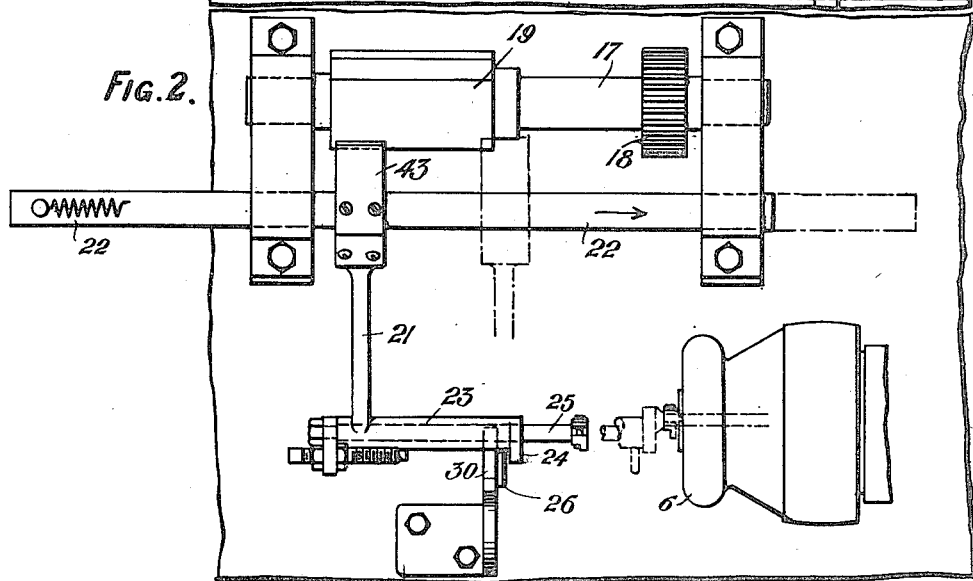
Figure 3:
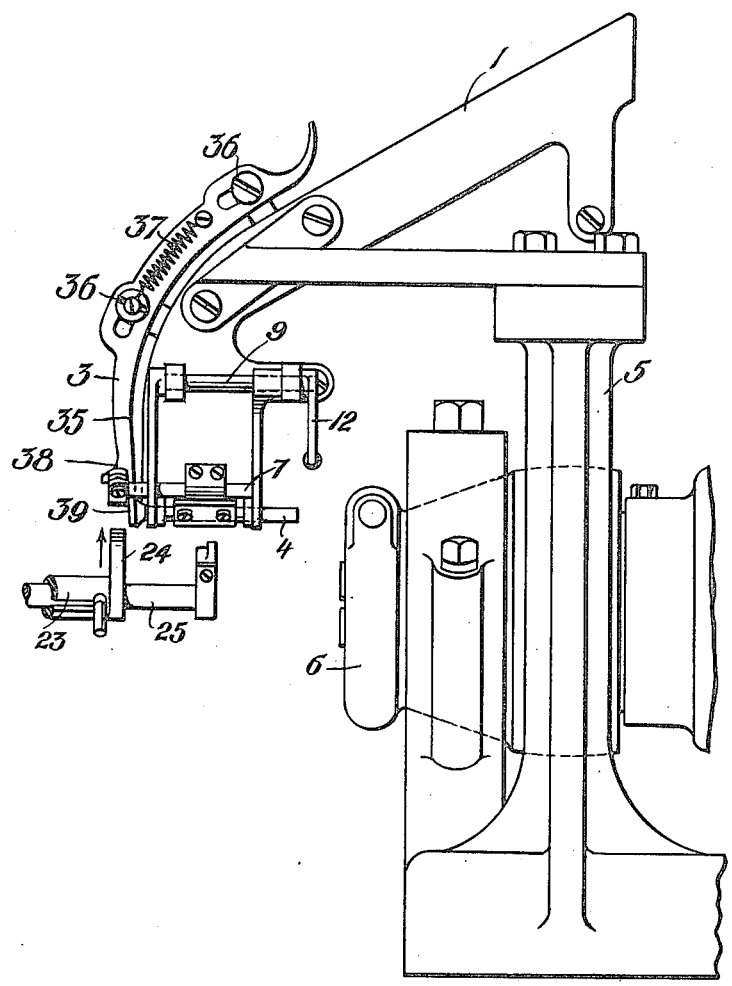
Figure 7:
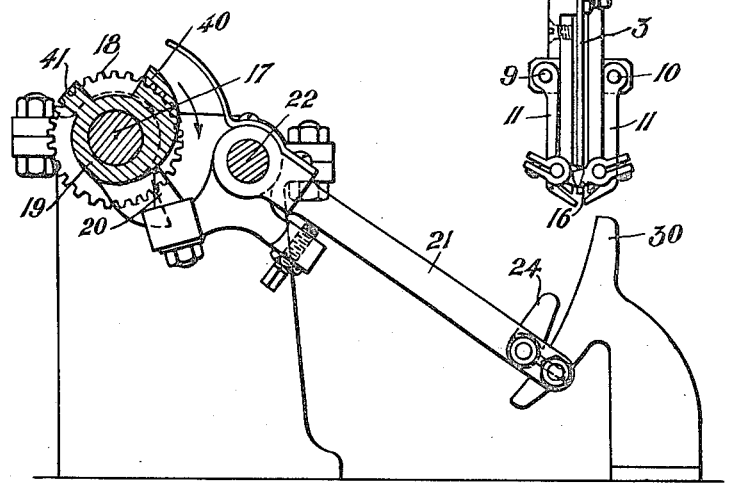
Figure 8:
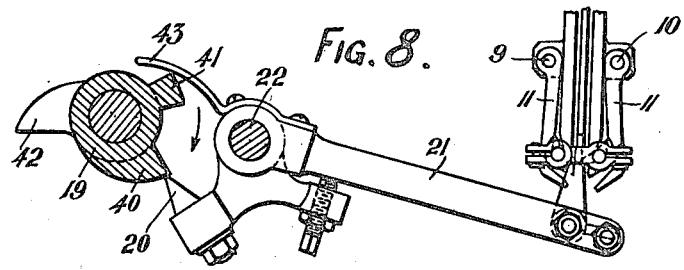
Figure 9:
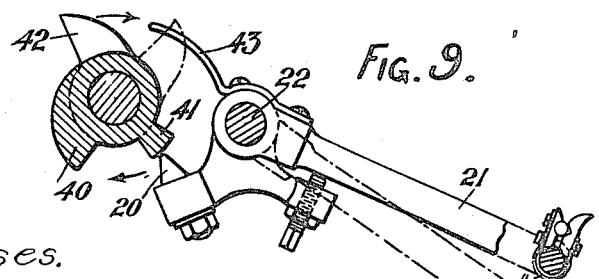

Figure 1 is a side elevation, and Fig. 2 a plan view showing the revoluble gripping jaws, the chute containing the blanks, and the feed mechanism connected therewith. Fig. 3 is a side elevation drawn to a somewhat larger scale than Fig. 1, illustrating the lower end of the chute and the gripping jaws, in order to more clearly show these parts. Fig. 4 shows the lower end of the chute and the mechanism connected therewith in end elevation, looking from the right hand of Fig. 3, Fig. 5 is a similar view of the lower end of the chute, but showing the same partly in section and with the carrying fingers coacting therewith, and Fig. 6 shows the end of the chute in elevation, but looking from the left hand side of Fig. 3. Fig. 7 shows the lower end of the chute and also the feed mechanism in end view looking from the left hand of Fig. 1, a portion of said feed mechanism being in section and in a position in which the carrying fingers are about to rise to take a blank from the chute, Fig. 8 is a similar view to Fig. 7, but showing the arm carrying the carrying fingers coacting with the mechanism of the chute and in the act of receiving a blank, and Fig. 9 shows the arm and the carrying fingers in the position in which the shank of the blank taken from the chute is coaxial with the axis of the gripping jaws. Fig. 10 is a front elevation, drawn to a larger scale, of the rod carrying the carrying fingers, and the sleeve by which the rod is carried and which is located upon the end of the feed arm. Fig. 11 is a right hand end elevation of the carrying fingers detached and drawn to a larger scale than the previous figures, and Fig. 12 is a sectional side elevation of same.

Referring more particularly to Figs. 1 to 6, the chute is composed of two parallel guide bars 1, 2 between which the shanks of the blanks pass while the heads rest upon the upper surface of the guide bars, and the chute is bent over into a vertical position near its lower end, and during the passage of the blanks toward the lower end the heads are retained in place by a guide piece 3, hereafter described, so that the lowermost blanks on the chute are in a substantially horizontal position, the blank being indicated therein at 4 Fig. 3. The chute is carried in any convenient manner from the framework of the machine, as by a bracket 5, and the end of the chute terminates at a sufficient distance above the axis of revoluble gripping jaws such as 6 of any convenient construction, adapted to receive the shank of a blank, to grip the same when required, to be revolved during the turning operation, and when the machine is constructed according to my United States Patent Specification No. 948,492 dated 8th February 1910 it is provided with mechanism by which, when the jaws are opened, the finished blank is shot out therefrom by spring action. On each outer face of the guide bars 1, 2 there is fitted in suitable bearings a rock shaft 7, 8, the shafts being horizontal and in the same plane. Above the shafts 7, 8 there are two parallel shafts 9, 10 also carried in bearings on the outer face of the guide bars 1, 2. Each shaft 9, 10 carries two arms 11, the ends of which extend downward and are bent toward each other sufficiently close together to retain the lowermost blank and prevent it falling from the chute, and these retaining arms 11 are held in the position shown at Fig. 4 by means of arms 12 on the shafts 9, 10 connected by a spring 13. The shafts 7, 8 are fitted with small cams or tappets 14 lying normally against the outer faces of the guide bars 1, 2 and in slight recesses formed in the retaining arms 11. The shafts 7, 8 are further provided with detent fingers 15 which lie normally in slots at the lower ends of the guide bars 1, 2. The shafts 7, 8 extend beyond the left hand edges, Fig. 3, of the guide bars 1, 2, and are each fitted with a tappet arm 16, Fig. 6, the inner end of one of such arms extending behind the inner end of the opposite arm. With such a construction it will be clear that if a moving member is brought to act with pressure contact upon the inner ends of both of the arms 16, Fig. 6, the shafts 7, 8 will be rocked, the cams 14 will be turned outward, separate the retaining arms 11 against the action of the spring 13 and permit the lowermost blank to fall, while simultaneously the detent fingers 15 will approach each other across the channel between the guide bars and come beneath the shank of that blank which is immediately above the lowest blank, and so retain all the blanks in position except the lowermost blank which is permitted to escape.

It is now requisite to describe in this specification the means through which the mechanism is operated by which the release of the lowermost blank is effected, by which the released blank is received, grasped and held with its axis parallel to the revoluble gripping jaws whatever its diameter, by which the shank of the blank is carried coaxial to and inserted into the jaws, and by which the blank is positively pushed thereinto whatever distance is necessary to leave the head of the said blank projecting a predetermined distance from the said jaws.

Referring more particularly to Figs. 1, 2, 7, 8 and 9, there is carried in bearings in the framework of the machine a shaft 17 revolved in any convenient manner at the requisite speed in the direction of the arrow, Fig. 7, say through the medium of the pinion 18 shown, and the shaft 17 carries a cam 19; the cam 19 acts upon a contact piece 20 carried by what I will term the feed arm 21, which is fixed on a shaft 22, free to rock about its axis and capable of being slid endwise in bearings in the framework of the machine. The shaft 22 will be rocked about its axis by the operation of the cam 19 upon the feed arm 21 and is drawn in the direction of the arrow, Fig. 1, by a spring, and is slid at proper times in the opposite direction by a cam actuated lever, not shown in the present drawings, acting upon the right hand end of the shaft 22. Fixed near the free end of the feed arm 21 and extending at right angles to the length thereof, is a sleeve 23, Figs. 1 and 2, and which sleeve is shown detached at Fig. 10. At the right hand end of the sleeve 23 is an upstanding pusher lug 24. Passing entirely through the tubular sleeve 23 is a finger-carrying rod 25 fitted with a pin 26, Fig. 10, entering a slot 27 in the sleeve 23, the rod 25 carrying at its right hand end carrying fingers for the blanks hereafter described, and upon its left hand end it is provided with a forwardly extending lug 28 carrying an adjustable contact screw 29. The contact screw 29 and the pin 26, which extends beyond the periphery of the sleeve 23, contact alternately with a stationary curved stop 30, Fig. 7. The carrying fingers are mounted on the right hand end of the rod 25 and consist of two opposed members, one member 31 being capable of angular movement about the axis of the rod 25, while the opposite member 32 is fixed to the rod 25, see Figs. 11 and 12. A spring 33 is fixed to the rigid member 32, and its opposite end extends to the back of the pivoted member 31 and tends to force the member 31 toward the member 32, the minimum distance between the members being regulated by the setting of a distance screw 34. The rigid member 32 is formed on its inner face with a slight concavity, while the opposite member is formed with a V-shaped notch to receive the screw blank, to center it, and to hold it with its axis parallel to the rod 25. The upper end of the inner surface of the member 31 is curved outwardly, this curved surface being intended to be brought into contact with the inwardly beveled lower end of the guide bar 1 of the chute, as in the position indicated at Fig. 5, in order to mechanically open the carrying fingers.

Referring to Fig. 3 of the drawings, in order to retain the blanks in their proper positions in the chute as they pass in succession between the guide bars 1, 2 and change the position of their axes therein from an angular position to a horizontal position as they reach the lower end of the chute, the curved guide piece 3 is provided. In accordance with this invention this guide piece 3 is not only so located and formed on its inner edge 35 to be adapted to prevent the blanks shifting in their descent to the left hand side of Fig. 3, but it is mounted and carried by pins 36 passing through slots in the guide piece 3, and a spring 37 is provided, normally retaining the guide piece 3 in a lower position, so that a foot 38, Figs. 3 and 6, of the guide piece rests upon the inner ends of tappet arms 16 Fig. 6, while a tongue 39 of the guide piece 3 extends rearward of and below the said tappet arms. By this device the heads of the blanks as they descend are maintained in the correct positions, and the head of the lowest blank it will be found is in contact with the tongue 39, while in addition each time the tappet arms 16 are operated to deliver a blank, the guide piece 3 receives an upward and downward movement relatively to the guide bars with a frictional action against the heads of the blanks in the chute, whereby it has been found the proper downward feed of the blanks is facilitated and stoppage of feed prevented.

The operation of the mechanism is as follows:—The feed shaft 22 being in the endway position shown at Figs. 1 and 2, the carrying fingers 31, 32 are at their greatest distance from the pusher lug 24, owing to the pin 26 having contacted with the stop 30 and slid the rod 25 in the sleeve 23.

The cam 19, Fig. 7, revolving in the direction of the arrow, carries upward the feed arm 21, and simultaneously brings the carrying fingers 31, 32 into the position shown at Fig. 5, opening the carrying fingers by contact of the member 31 with the end of the chute. At the same time the upper end of the pusher lug 24 Fig. 4 contacts beneath and rocks the arms 16, and consequently rocks the two shafts 7, 8, Figs. 4, 5 and 6, so separating the lower ends of the retaining arms 11 against the action of the spring 13 permitting the lowermost blank to drop into the now open and gaping carrying fingers, and simultaneously bringing the detent fingers 15 beneath the next upper blank. The pusher lug 24, rocking the arms 16, gives an upward movement to the guide piece 3 which frictionally acts in an upward direction on the heads of the blanks in the chute. At this moment the enlarged part 40, Fig. 7, of the cam 19 leaves the contact piece 20 of the feed arm 21, and the feed arm immediately descends to a distance predetermined by the shape of cam 19, carrying in its fingers the blank it has collected and which it holds in a horizontal position. At the same time the guide piece 3 descends, again frictionally acting on the heads of the blanks in the chute, such motions of the guide piece it has been found effectually preventing any sticking of the blanks and causing them to freely descend in the chute, while the foot 38 of the guide piece 3, owing to the action of the spring 37, forms an auxiliary means for instantly bringing the shafts 7, 8 to their normal angular positions.

In the machine as I construct it and as described in my United States Patent Specification No. 948492 dated 8th February 1910, when held as described, the fingers and the blank they carry are below the axis of the revolving jaws, and consequently quite clear of the same, and it is at this time that the blank already in those jaws is finished and is ejected by spring action. As soon as the ejection has taken place, the enlargement 41 of the cam 19 comes above the contact piece 20 and raises the feed arm 21 and the carrying fingers until the shank of the blank is coaxial with the axis of the revoluble jaws 6 which are now open to receive it. At this moment the spring governing the endway movement of the shaft 22 is permitted to act, and the shaft is slid endwise to the right hand, considering Figs. 1 and 2, with the result that the shank of the blank is traversed into the mouth of the revoluble jaws still held by the carrying fingers. The contact screw 29 on the rod 25 then contacts with the stop 30, Figs. 2 and 7, and prevent further endway movement of the carrying fingers and the rod 25, but the continued endway movement of the shaft 22 carries the pusher lug endwise still, causing it to approach toward and contact with the head of the blank and to definitely and mechanically push the shank of the blank through the carrying fingers until its head projects the predetermined distance from the revoluble jaws. During this action the cam 19 is in about the position shown at Fig. 9, but as soon as the contact piece 20 leaves the part 41 of the cam 19, a projecting part 42 at the right hand end of the said cam contacts with a wing 43 on the feed arm 21 and insures the carrying fingers being brought away from the blank to below the same into about the position indicated by the dotted lines in Fig. 9. Although it is preferable to so positively bring the carrying fingers away from the blank by means of a part on the cam 19 contacting with the wing 43 on the feed arm 21, yet it will be understood that such positive means may be dispensed with and the feed arm 21 may be brought away by means of a spring or even by gravity. Immediately the shaft 22 is slid endwise in the opposite direction to the arrow, Fig. 1, the pin 26 of the rod 25 contacts with the stop 30, as shown at Figs. 1 and 2, thus bringing this feed device into position for the next feed operation.

It should be remarked that as soon as the pusher lug 24 descends away from the arms 16, Fig. 6, of the shafts 7, 8 at the end of the chute, the said shafts and the members connected with them and acted upon by them, immediately resume the position shown at Fig. 4, and the lowermost blank then descends upon and is supported by the ends of the arms 11.

What I claim as my invention and desire to secure by Letters Patent is:—

1. In screw-blank feeding mechanism of the type specified comprising a blank-carrying chute having two spacially arranged guide-bars between which the blanks are located and from which chute the blanks are taken with their axes in a horizontal plane the combination with a feed arm mechanism operative thereon to raise and lower said arm, blank carrying fingers on said arm adapted to receive the lower-most blank from the chute when said arm is raised, blank-retaining arms pivotally mounted on said guide-bars, and resilient means to draw said arms toward each other to cause the latter to partially close the lower end of said chute; of a rock-shaft carried in bearings on the outer face of each guide bar and adapted to be rocked by said feed arm to coact with said blank-retaining arms to move said latter arms to open the lower end of said chute when said feed arm is raised, whereby the lowermost blank is released and received by said blank-carrying fingers, and detents on said rockshaft adapted to pass through slots in said guide bars and contact with the blank next to the lowermost to support and retain the blanks in said chute while said lowermost blank is released.

2. In screw-blank feeding mechanism of the type specified comprising a blank-carrying chute having two spacially arranged guide-bars between which the blanks are located and from which chute the blanks are taken with their axes in a horizontal plane, the combination with a feed arm mechanism operative thereon to raise and lower said arms, blank carrying fingers hingedly supported on said arm, a spring to normally retain said fingers in their closed position, an inclined abutment at the lower end of each guide bar adapted to contact with said blank-carrying fingers to separate the latter a suitable distance to receive a screw blank when said feed arm is raised, blank-retaining arms pivotally mounted on said guide bars, and resilient means to draw said arms toward each other to cause the latter to partially close the lower end of said chute; of a rock shaft carried in bearings on the outer face of each guide bar and adapted to be rocked by said feed arm to coact with said blank-retaining arms to move said latter arms to open the lower end of said chute when said feed arm is raised whereby the lowermost blank is released and received by said blank-carrying fingers, and detents on said rock shafts adapted to pass through slots in said guide bars and contact with the blank next to the lowermost to support and retain the blanks in said chute while said lowermost blank is released.

3. In screw blank feeding mechanism of the type specified comprising a blank-carrying chute having two spacially arranged guide bars between which the blanks are located the heads of the blanks projecting beyond the forward edges of said guide bars, and from which chute the blanks are taken with their axes in a horizontal plane the combination with a feed arm mechanism operative thereon to raise and lower said arm, blank-carrying fingers on said arm adapted to receive the lowermost blank from the chute when said arm is raised, a guide piece slidably carried by one of the guide bars and located forward of said guide bars against which guide piece the head of the lowermost blank in the chute bears, means to raise said guide piece when said feed arm is approaching the end of its upward movement in position for the blank-receiving fingers to receive a blank, a helical spring secured at its opposite ends to said slide bar and said guide bar to return the said slide bar to its lower position when said blank-receiving fingers have received a blank from the chute and are lowered with said blank, blank-retaining arms pivotally mounted on said guide bars, and resilient means to draw said arms toward each other to cause the latter to partially close the lower end of said chute; of a rock shaft carried in bearings on the outer face of each guide bar and adapted to be rocked by said feed arm to coact with said blank-retaining arms to move said latter arms to open the lower end of said chute when said feed arm is raised, whereby the lowermost blank is released and received by said blank-carrying fingers, and detents on said rock shafts adapted to pass through slots in said guide bars and contact with the blank next to the lowermost to support and retain the blanks in said chute while said lowermost blank is released.

4. In screw-blank feeding mechanism of the type specified comprising a blank-carrying chute having two spacially arranged guide bars between which the blanks are located and from which chute the blanks are taken with their axes in a horizontal plane; the combination with a feed arm mechanism operative thereon to raise and lower said arm, blank-carrying fingers on said arm adapted to receive the lowermost blank from the chute when said arm is raised, blank-retaining arms pivotally mounted on said guide-bars, and resilient means to draw said arms toward each other to cause the latter to partially close the lower end of said chute; of a rock shaft carried in bearings on the outer face of each guide bar, a tappet on the end of one rock shaft, a tappet on the corresponding end of the other rockshaft, said tappets overlapping one another, a lug on said feed arm adapted to engage said tappets and rock said rock shafts when said feed arm approaches the extent of its upward movement, cams on said rock shafts to contact with said blank-retaining arms to move said arms to open the lower end of said chute when said shafts are rocked by said lug, whereby the lowermost blank is released and received by said blank-carrying fingers, and detents on said rock shafts adapted to pass through slots in said guide bars and contact with the blank next to the lowermost to support and retain the blanks in said chute while said lowermost blank is released.

5. In screw blank feeding mechanism of the type specified comprising a blank-carrying chute having two spacially arranged guide bars between which the blanks are located the heads of the blanks projecting beyond the forward edges of said guide bars and from which chute the blanks are taken with their axes in a horizontal plane, the combination with a feed arm mechanism operative thereon to raise and lower said arm, blank-carrying fingers on said arm adapted to receive the lowermost blank from the chute when said arm is raised, a guide piece slidably carried by one of the guide bars and located forward of said guide bars against which guide piece the head of the lowermost blank in the chute bears, blank-retaining arms pivotally mounted on said guide-bars, and resilient means to draw said arms toward each other to cause the latter to partially close the lower end of said chute; of a rockshaft carried in bearings on the outer face of each guide bar, a tappet on the end of one rock shaft, a tappet on the corresponding end of the other rock shaft, said tappets overlapping one another, a lug on said feed arm adapted to engage said tappets and rock said rock shafts when said feed arm approaches the extent of its upward movement, cams on said rock shafts to contact with said blank-retaining arms to move said arms to open the lower end of said chute when said shafts are rocked by said lug, whereby the lowermost blank is released and received by said blank-carrying fingers, a projection on said guide piece adapted to be operated upon by said tappets to raise said guide piece when said rock shafts are moved to open the blank-retaining arms, and detents on said rock shafts adapted to pass through slots in said guide bars and contact with the blank next to the lowermost to support and retain the blanks in said chute while said lowermost blank is released.

In witness whereof I have hereunto set my hand in the presence of two witnesses.

WILLIAM AVERY.

Witnesses:
 THOMAS W. ROGERS,
 WILLIAM A. MARSHALL.